Patented Aug. 7, 1951

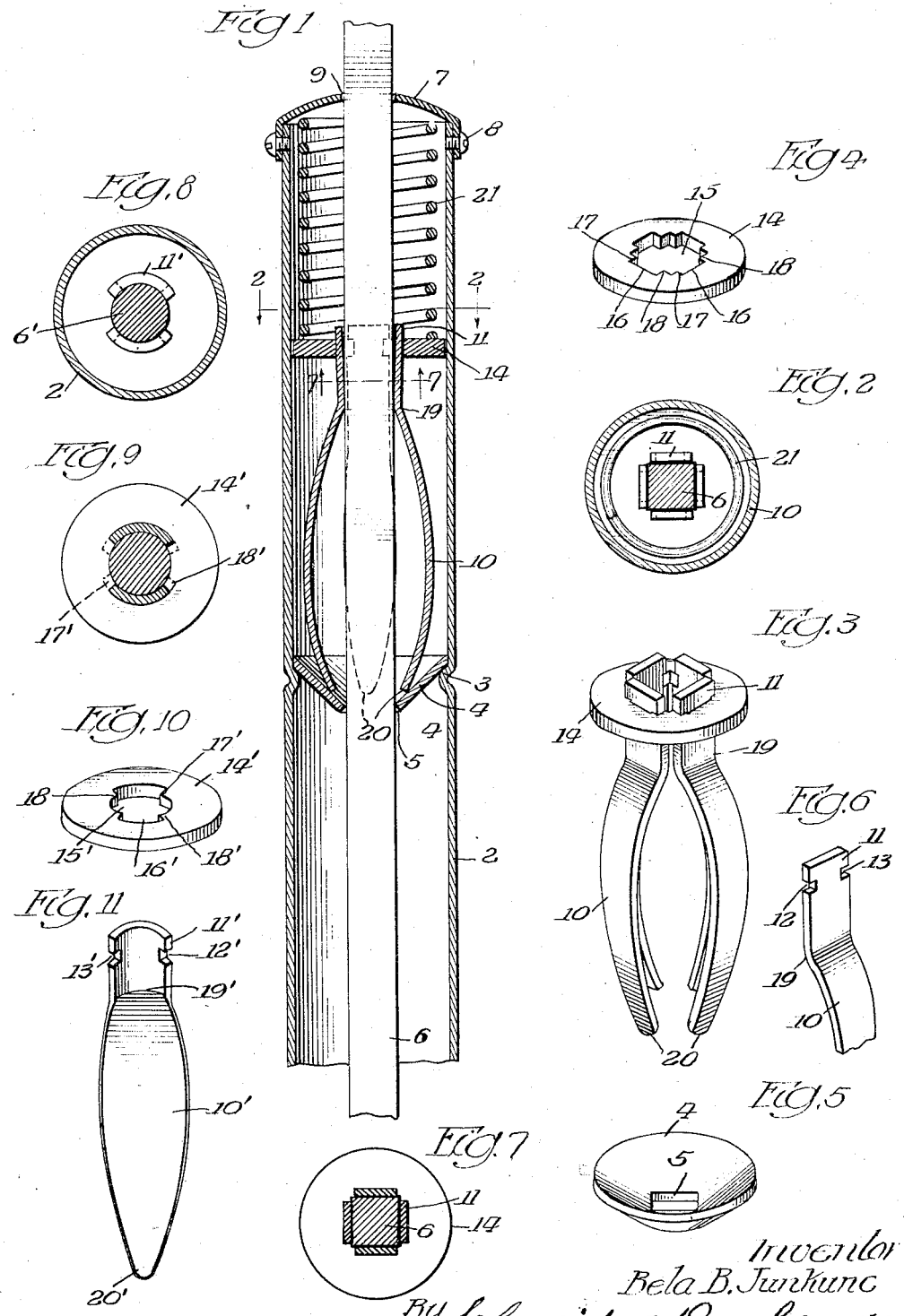

2,563,040

UNITED STATES PATENT OFFICE 2,563,040

AUTOMATIC FRICTION LOCK

Bela B. Junkunc, Chicago, Ill., assignor to Bela B. Junkunc, Alexander Junkunc, Sr., Alexander Junkunc, Jr., and Joseph G. Junkunc, doing business as J. & J. Tool & Machine Co., Chicago, Ill.

Application September 3, 1947, Serial No. 771,868

10 Claims. (Cl. 287—58)

1

This invention relates to an automatic friction lock adapted to hold telescoping members in any adjusted position.

In accordance with the present invention an automatic friction lock engages a slidable rod enclosed in a tubular housing and holds the rod against accidental movement longitudinally relative to the housing. In this friction lock, movement of the rod is easier in one direction than in the other. If the relatively movable members are arranged vertically, the friction lock mechanism is preferably arranged so that the movable member can be moved upwardly more readily than downwardly notwithstanding that the weight of any object supported by the movable member, as well as the weight of the movable member itself, normally urges the movable member downwardly.

The principle of the automatic friction lock hereinafter described is capable of broad application and may be used in many different structures. It is applicable to any mechanism where a variation of tension or resistance to movement of a rod, or similar member, within a tubular member is required. The friction lock may be used advantageously in adjustable stands for supporting moving picture screens, lights, reflectors, display fixtures, and similar devices. It may also be used on tripods or any laboratory equipment supported on adjustable legs. Other uses for the friction lock are on extensible radio aerials, and chairs, stools or other furniture which may be adjustable in height. The above mentioned uses are recited to give a more complete understanding of the invention and it will be understood that the invention is not limited to these specific uses.

The structure by which the various results are attained will be described in connection with the accompanying drawing, in which:

Figure 1 is a fragmentary longitudinal sectional view through a tubular housing and an automatic friction lock holding a slidable rod in adjusted position within the tubular housing;

Fig. 2 is a cross sectional view, taken along the line 2—2 of Fig. 1, showing the top portion of the friction lock in elevation;

Fig. 3 is a detail perspective view of the friction lock disassembled from the rod and housing;

Fig. 4 is a detail perspective view of the disk which holds the top portions of the spring fingers of the lock;

Fig. 5 is a detail perspective view of a funnel shaped member which engages the bottom portions of the spring fingers of the lock;

2

Fig. 6 is a fragmentary detail perspective view showing the top portion of one of the spring fingers of the lock;

Fig. 7 is a cross sectional view, taken along the line 7—7 of Fig. 1;

Fig. 8 is a cross sectional view, similar to Fig. 2, through a modified embodiment of the invention in which the rod has a round cross section;

Fig. 9 is a cross sectional view, similar to Fig. 7, of the embodiment shown in Fig. 8;

Fig. 10 is a detail perspective view, similar to Fig. 4, of the disk adapted for use with the round rod of the embodiment shown in Fig. 8; and Fig. 11 is a side elevation of one of the spring fingers of the lock adapted for use with the round rod of the embodiment of Fig. 8.

In the drawings, the reference numeral 2 indicates a tubular housing which may be supported in upright position by any suitable base (not shown). The housing may be of any desired cross sectional configuration, but is shown as being circular. An inwardly extending protuberance 3 forms a ledge inside the housing for supporting the outer edge of a funnel-shaped member 4. Protuberance 3 may be continuous, extending entirely around the circumference of the housing, or it may comprise a discontinuous series of projections spaced around the circumference of the housing at the same level and at intervals close enough to furnish adequate support for member 4.

An aperture 5, in the bottom of member 4, is shaped to conform to the cross sectional area of a slidable rod 6 and is slightly larger to permit free movement of the rod through the aperture. In the embodiment of the invention illustrated in Figs. 1 to 7, inclusive, rod 6 is of square cross section. The upper end of housing 2 is closed by means of a cap 7 secured to the housing by a plurality of bolts 8. Cap 7 also has an aperture 9 through which rod 6 extends.

In cases where the rod and housing comprise a stand, the object to be supported is mounted on the upper end of rod 6.

The frictional lock mechanism of the present invention includes a plurality of relatively stiff spring fingers 10 which are notched adjacent the upper portions 11, as indicated at 12 and 13 in Fig. 6, to engage a disk 14 positioned in housing 2 between funnel-shaped member 4 and cap 7. Disk 14 is apertured, as indicated at 15 in Fig. 4, to fit around rod 6. Notches 16 extending from the edges of aperture 15 toward the perimeter of the disk are of less width than the sides of aperture 15 and are disposed centrally thereof so as to leave projections 17 and 18 at adjacent corners of aperture 15. Notches 12 and 13 of each spring finger 10 are interengaged with a pair of projections 17 and 18, respectively, to support fingers 10 on disk 14. Notches 12 and 13 are slightly wider than the thickness of disk 14 so as to permit fingers 10 to have a slight pivotal movement normal to rod 6.

The top end 11 of each finger 10 is spaced very slightly from rod 6 and extends inwardly into contact with the rod, from approximately the middle of upper portion 11 downwardly to the juncture 19 of this portion and the dependent bowed portion of the spring finger. This portion of each spring finger in contact with rod 6 constitutes a substantial area of frictional contact.

Each finger 10 is bowed outwardly between the juncture point 19 and its lower end 20. The lower end of each finger engages funnel-shaped member 4. A coiled spring 21, encircling rod 6, is positioned between cap 7 and disk 14. Since cap 7 is fixed, the spring bears against disk 14 to urge it downwardly. The downward thrust of the spring is opposed by the relative stiffness of fingers 10 and funnel-shaped member 4, which is held against downward movement by protuberance 3. The upper portions of spring fingers 10 are normally held in fixed position with sufficient frictional contact with the outer surfaces of rod 6 to hold the rod in any adjusted position within housing 2.

When force is applied to rod 6 to move it upwardly relative to housing 2 the initial application of force moves the fingers and disk 14 upwardly a very slight distance against the action of spring 21. This movement frees lower ends 20 of the spring fingers from contact with funnel-shaped member 4 so that they can swing outwardly slightly, and upper portions 11 move into substantial parallelism with rod 6 to decrease the frictional contact between the spring fingers and the rod. As soon as the moving force against the rod is released, spring 21 reacts to restore the balance and the rod is held at the position to which it has been moved.

Downward movement of the rod requires a greater force than upward movement because downward pressure on the rod forces lower ends 20 of the spring fingers against funnel-shaped member 4 and increases the bow of the spring fingers, thereby binding the upper portions of the fingers more tightly against the rod.

In assembling the mechanism, cap 7 is threaded on rod 6 and spring 21 is then positioned around the rod. Fingers 10 are engaged with disk 14 by interengagement of notches 12 and 13 with projections 17 and 18 to form an assembly unit which is then threaded on rod 6. Funnel-shaped member 4 is dropped into housing 2 so that it assumes the position shown in Fig. 1. The lower end of rod 6 is then threaded through aperture 5 in the funnel-shaped member. Cap 7 is then fitted around the outside of housing 2 and is secured in place.

The bottom of housing 2 may be provided with a base to permit it to stand upright, and the top of rod 6 may be provided with any suitable fitting to enable it to support any specific article, such as a motion picture projection screen, for example.

In the embodiment of the invention illustrated in Figs. 8 to 11, inclusive, a round rod 6′ is substituted for square rod 6. It will be understood that the rod may be of any other desired shape. Fingers 10′ have their upper portions 11′ rounded to fit the rod and are notched, as indicated at 12′ and 13′. Disk 14′ has a circular aperture 15′, notched as indicated at 16′, to provide projections 17′ and 18′ adapted to engage notches 12′ and 13′. The drawing shows only two fingers 10′ but it is obvious that this number may be increased.

Although two preferred embodiments of the invention have been described in considerable detail, it will be understood that the description thereof is intended to be illustrative, rather than restrictive, as many details of structure may be modified or changed without departing from the spirit or scope of the invention. Accordingly, I do not desire to be restricted to the exact structure described, except as limited by the appended claims.

I claim:

1. In combination with a rod, a friction lock comprising a plurality of spring fingers spaced circumferentially around said rod, said spring fingers each having its upper portion positioned adjacent said rod and its lower portion bowed away therefrom, a disk embracing said rod and the upper portions of said spring fingers to hold said spring fingers against said rod, and a funnel-shaped member engaging the lower ends of said spring fingers to increase the bow of said fingers when force is applied against said rod to move it in one direction and thereby cause the upper portion of each spring finger to bind it more tightly against said rod.

2. In combination with a rod, a friction lock comprising a plurality of spring fingers bowed outwardly intermediate their ends, each of said fingers having its upper portion engaging said rod, a disk engaging the upper portions of said fingers to hold said upper portions against said rod, and a fixed disk engaging the lower ends of said fingers whereby force tending to move said rod downwardly will increase the amount of bow in said fingers to cause the upper portions thereof to bind more tightly against said rod.

3. In combination with a tubular housing and a rod slidable in said housing, a friction lock mechanism comprising a plurality of relatively stiff spring fingers, a disk in said housing supporting the upper ends of said spring fingers, and a funnel-shaped member mounted in said housing and engaging the lower ends of said spring fingers, said spring fingers each having a portion adjacent its top end engaging said rod to hold said rod in position within said housing.

4. A frictional lock mechanism comprising a tubular housing, an apertured cap closing the top of said housing, an apertured disk mounted in said housing, a rod fitting in said apertures and slidable longitudinally relative to said housing, a plurality of spring fingers fixed with relation to said disk with a portion of each finger in contact with said rod, a funnel-shaped member engaging the lower portions of said fingers and held against downward movement, and a spring urging said disk downwardly, thereby pressing the lower portions of said fingers against said funnel-shaped member and applying sufficient force to the contact areas of said fingers against said rod to hold said rod in any adjusted position within said housing.

5. In combination with a tubular housing and a rod slidable in said housing, a plurality of relatively stiff spring fingers positioned in said housing, means holding the lower portions of said fingers against downward movement, each of said fingers having its upper portion shaped to conform to the outer surface of said rod, a disk in said housing apertured to fit around said rod, said disk being notched adjacent said aperture, said fingers each having its upper portion notched, the edges of said disk adjacent the notches in said disk engaging the notched portions of said fingers and thereby holding the upper portions of said fingers in frictional contact with said rod.

6. A frictional lock mechanism comprising a tubular housing, a rod slidable in said housing, a disk in said housing apertured to receive said rod, a plurality of pairs of projections on said disk adjacent said aperture, a plurality of spring fingers each provided with a pair of notches engaging said projections to support said fingers with a portion of each of said fingers engaging said rod in any adjusted position in said housing, and a member fixed in said housing engaging the lower ends of said fingers to resist downward movement of said disk and fingers.

7. A frictional lock mechanism comprising a tubular housing, a rod slidable in said housing, a plurality of spring fingers positioned in said housing and engaging said rod to hold it in any adjusted position in said housing, a disk in said housing supporting the upper ends of said fingers, a coiled spring bearing against the top of said disk urging said disk downwardly, and a fixed member engaging the lower ends of said fingers to resist movement of said disk downwardly.

8. In combination with a tubular housing and a rod slidably mounted therein, a friction lock mechanism comprising a disk mounted in said housing and apertured to fit around said rod, a plurality of spring fingers supported by said disk in frictional contact with said rod, a coiled spring bearing against said disk to offer a slight resistance to movement of said rod in one direction, and a member engaging said fingers to provide greater resistance to movement of said rod in the opposite direction.

9. A friction lock mechanism comprising a tubular housing, a closure secured to the upper end of said housing, a funnel-shaped member fixed in said housing, a disk positioned in said housing between said closure and said funnel-shaped member, a rod slidable in said housing, said closure, disk and funnel-shaped member each being apertured to fit around said rod, a spring coiled around said rod between said closure and said disk to resist upward movement of said disk, and a plurality of spring fingers depending from said disk, the upper portions of said fingers frictionally engaging said rod to hold it in any adjusted position in said housing, said funnel-shaped member engaging the lower ends of said fingers whereby downward pressure on said rod bows said fingers outwardly to increase the frictional contact of the upper portions of said fingers with said rod.

10. In a friction lock mechanism, a tubular housing, a rod slidable in said housing, a disk mounted in said housing and apertured to fit around said rod, a plurality of spring fingers each interengaged at its upper end with said disk, said interengagement permitting a slight pivotal movement of said fingers normal to said disk, the portion of each finger immediately below the point of said interengagement being held in frictional contact with the outer surface of said rod by said disk, a ledge extending inwardly of said housing below said disk, and a member supported on said ledge, said member engaging the lower ends of said fingers, said fingers being bowed outwardly between said frictional contact area and the lower ends of said fingers, whereby force tending to move said rod downwardly increases the bow of said fingers and causes a slight pivotal movement of said fingers adjacent said disk to increase the frictional contact with said rod.

BELA B. JUNKUNC.

No references cited.